US007671921B2

(12) United States Patent
Hirooka et al.

(10) Patent No.: US 7,671,921 B2
(45) Date of Patent: Mar. 2, 2010

(54) IMAGE PICKUP APPARATUS HAVING A MOVABLE GRIP PORTION (75) Inventors: Junji Hirooka, Higashimurayama (JP); Hideki Kawai, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 633 days.

(21) Appl. No.: 11/470,274

(22) Filed: Sep. 6, 2006

(65) Prior Publication Data
US 2007/0070239 A1 Mar. 29, 2007

(30) Foreign Application Priority Data
Sep. 12, 2005 (JP) ............... 2005-264040

(51) Int. Cl.
H04N 5/225 (2006.01)
H04N 5/222 (2006.01)
G06F 3/00 (2006.01)

(52) U.S. Cl. ............... 348/375; 348/373; 348/333.06; 715/700; 715/762

(58) Field of Classification Search ............... 348/373, 348/375, 333.06; 715/700, 762
See application file for complete search history.

(56) References Cited
U.S. PATENT DOCUMENTS
7,110,040 B1 * 9/2006 Misawa ............... 348/373

2004/0203533 A1 * 10/2004 Yu et al. ............... 455/90.3
2005/0184972 A1 * 8/2005 Tashiro et al. ............... 345/173
2005/0212942 A1 * 9/2005 Sakai ............... 348/333.01
2006/0034451 A1 * 2/2006 Ijas et al. ............... 379/433.13
2007/0024736 A1 * 2/2007 Matsuda et al. ............... 348/333.12

FOREIGN PATENT DOCUMENTS
EP 1298909 A1 * 4/2003
JP H11-289484 10/1999

OTHER PUBLICATIONS
Nikon Coolpix SQ Digital Camera Manual, by Nikon Corp. (2003).*
Digital Camera Resorce Page Review—Nikon Coolpix SQ—by Jeff Keller (last update: Sep. 9, 2003).*

* cited by examiner

Primary Examiner—Tuan Ho
Assistant Examiner—Marly Camargo
(74) Attorney, Agent, or Firm—Cowan, Liebowitz & Latman, P.C.

(57) ABSTRACT

An image pickup apparatus comprises: an image pickup unit for picking up an object image; an image display unit for displaying an image; a grip portion to be grasped by an operator; a moving portion for allowing the grip portion to move between a first position in which the grip portion overlaps part of the image display unit and a second position in which the grip portion does not overlap the image display unit.

9 Claims, 11 Drawing Sheets

IMAGE PICKUP APPARATUS HAVING A MOVABLE GRIP PORTION

BACKGROUND OF THE INVENTION

1. Field of the Invention

The present invention relates to an image pickup apparatus having a movable grip portion and a method of controlling the same.

2. Description of the Related Art

An electronic camera such as conventional digital cameras is equipped with an image display unit such as a liquid crystal monitor in the rear face of the electronic camera body, and is provided with a grip portion for facilitating the grasping of the electronic camera, arranged at a location corresponding to a predetermined part of the hand of the photographer grasping the camera.

Due to rapidly advancing technology innovations in recent years, while there have been advances in weight and size reduction of the electronic camera, attempts have been made to enlarge the image display unit to improve the visibility of the photographing screen and to facilitate the operation of the operation screen (e.g., Japanese Patent Application Laid-Open No. H11-289484).

However, downsizing the electronic camera as well as enlarging the image display unit will inevitably result in an increase in the area proportion of the image display unit to the rear face of the electronic camera. Thus, a problem arises in that the proportion of the grip portion is reduced and this makes it difficult to grasp the electronic camera such as during photographing.

SUMMARY OF THE INVENTION

As an embodiment of the present invention, an image pickup apparatus of the present invention comprises an image pickup unit adapted to pick up an object image, an image display unit adapted to display an image, a grip portion to be grasped by the operator, a moving unit adapted to allow the grip portion to move between a first position in which the grip portion overlaps part of the image display unit and a second position in which the grip portion does not overlap the image display unit.

As another embodiment of the present invention, a method of the present invention of controlling an image pickup apparatus having a image pickup unit for picking up an object image, an image display unit for displaying an image, and a grip portion to be grasped by an operator, comprising a step of displaying the image in a first size on the image display unit, when the grip portion is at a first position in which the grip portion overlaps part of the image display unit, and displaying the image in a second size which is larger than the first size on the image display unit, when the grip portion is at a second position in which the grip portion does not overlaps the image display unit.

Further features of the present invention will become apparent from the following description of exemplary embodiments (with reference to the attached drawings).

DESCRIPTION OF THE EMBODIMENTS

Hereinafter, the preferred embodiments of the present invention will be described in detail with reference to appended drawings.

Figure 1:
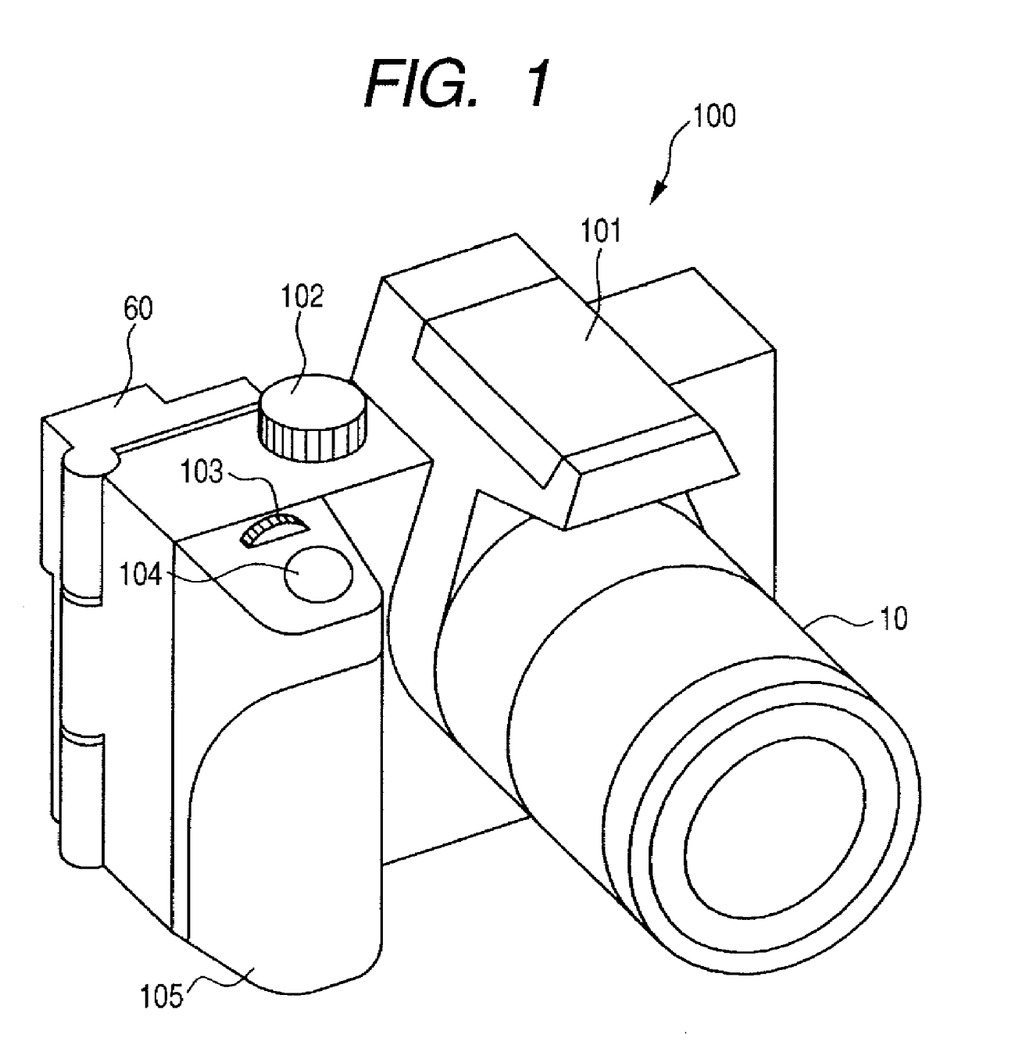
FIG. 1 illustrates a front perspective view of the digital camera according to an embodiment of the present invention.

FIG. 1 illustrates a front perspective view of the digital camera according to an embodiment of the present invention. In FIG. 1, the digital camera 100 comprises a detachable lens unit 10, a flashlight emitting unit 101, a dial switch 102, a shutter button 104, an electronic dial 103, a front grip portion 105 and a rear grip portion 60.

The flashlight emitting unit 101 is provided in the top part of the digital camera 100 and pops up to emit light upon usage. The dial switch 102 is a switch for switching over the modes while photographing. The shutter button 104 is disposed at a position corresponding to the pointing finger of the photographer during photographing so that the photographer operates the shutter button while photographing images. The electronic dial 103 is used to select and set values relating to photographing, such as a shutter speed and an aperture value. The front grip portion 105 and the rear grip portion 60 are provided in the front and rear portions of the digital camera 100 respectively so that the photographer grasps the digital camera 100, for example, during photographing. Moreover, in the rear grip portion 60, a projection portion may be formed at a location corresponding to, for example, the right-hand thumb of the photographer. In this case, preferably the projection portion is configured to have, for example, a curved shape to fit the thumb.

Figure 2:
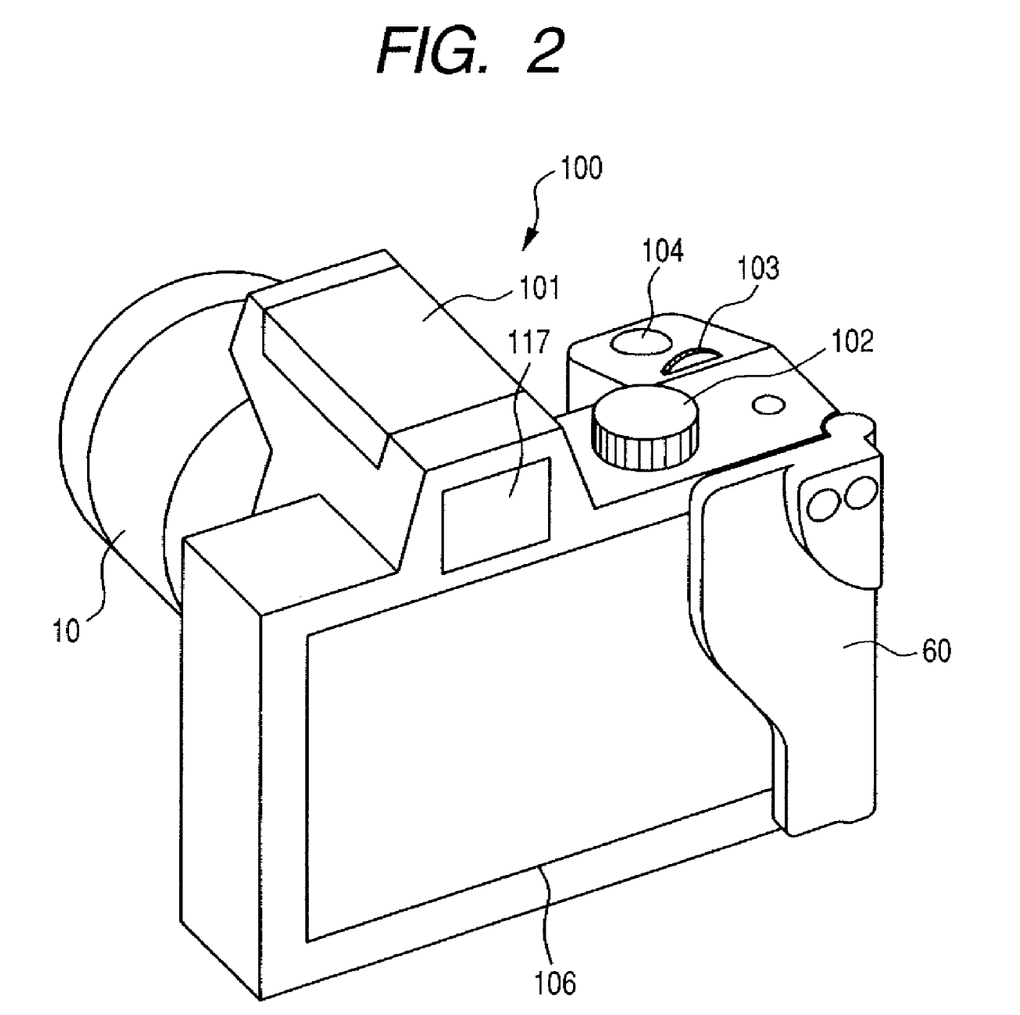
FIG. 2 illustrates a rear perspective view of the digital camera.

FIG. 2 illustrates a rear perspective view of the digital camera 100. As shown in FIG. 2, an image display unit 106 which can display images is provided in the rear face of the digital camera 100. The image display unit 106 is constructed, for example, with a liquid-crystal touch panel etc., on which a menu screen, a viewfinder image, a reproduced image, etc. are displayed. Further, a viewfinder eyepiece unit 117 is provided in the top part of the rear face of the digital camera 100.

Figure 3:
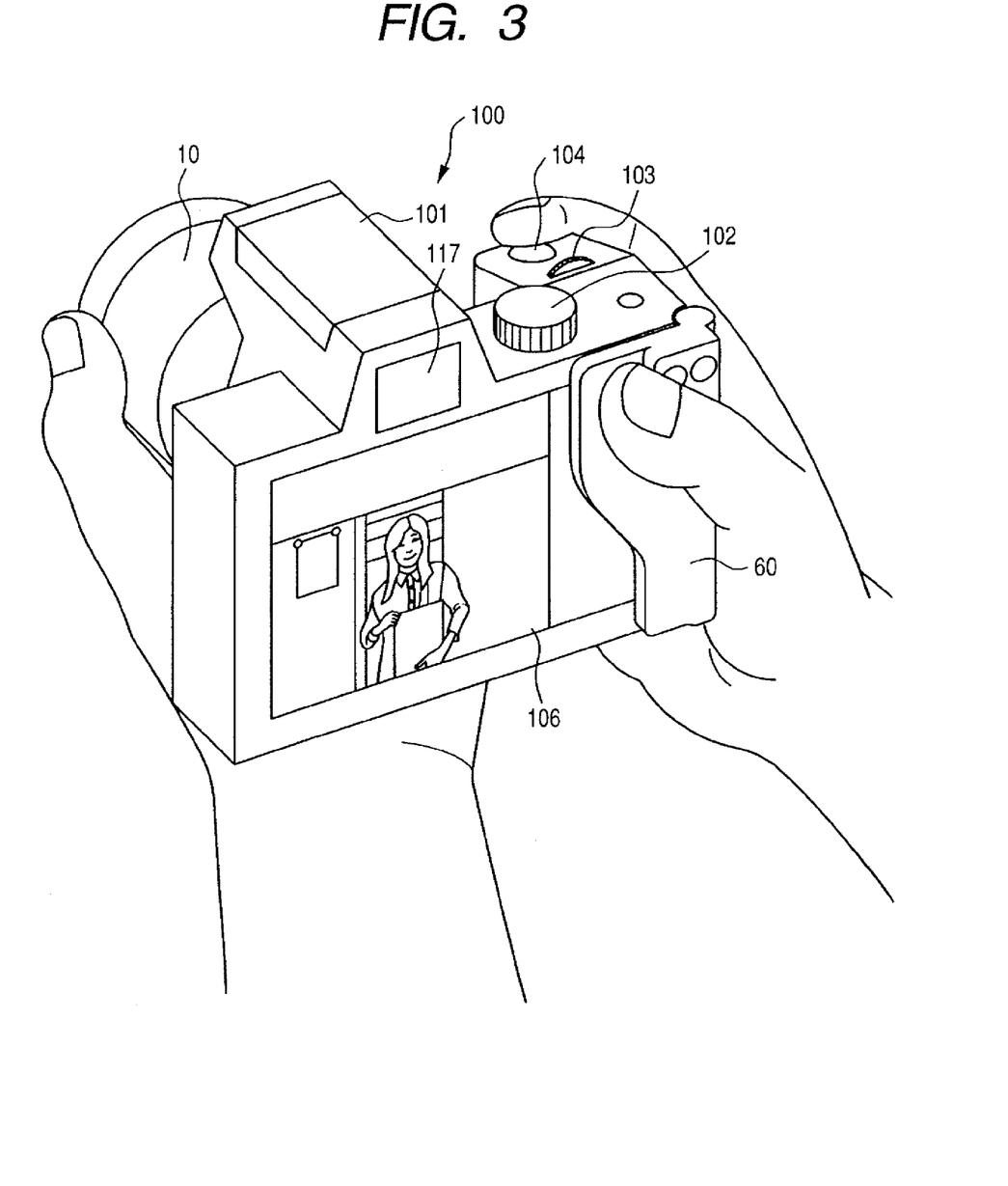
FIG. 3 illustrates a rear perspective view of the digital camera with its rear grip portion being in closing state.
Figure 4:
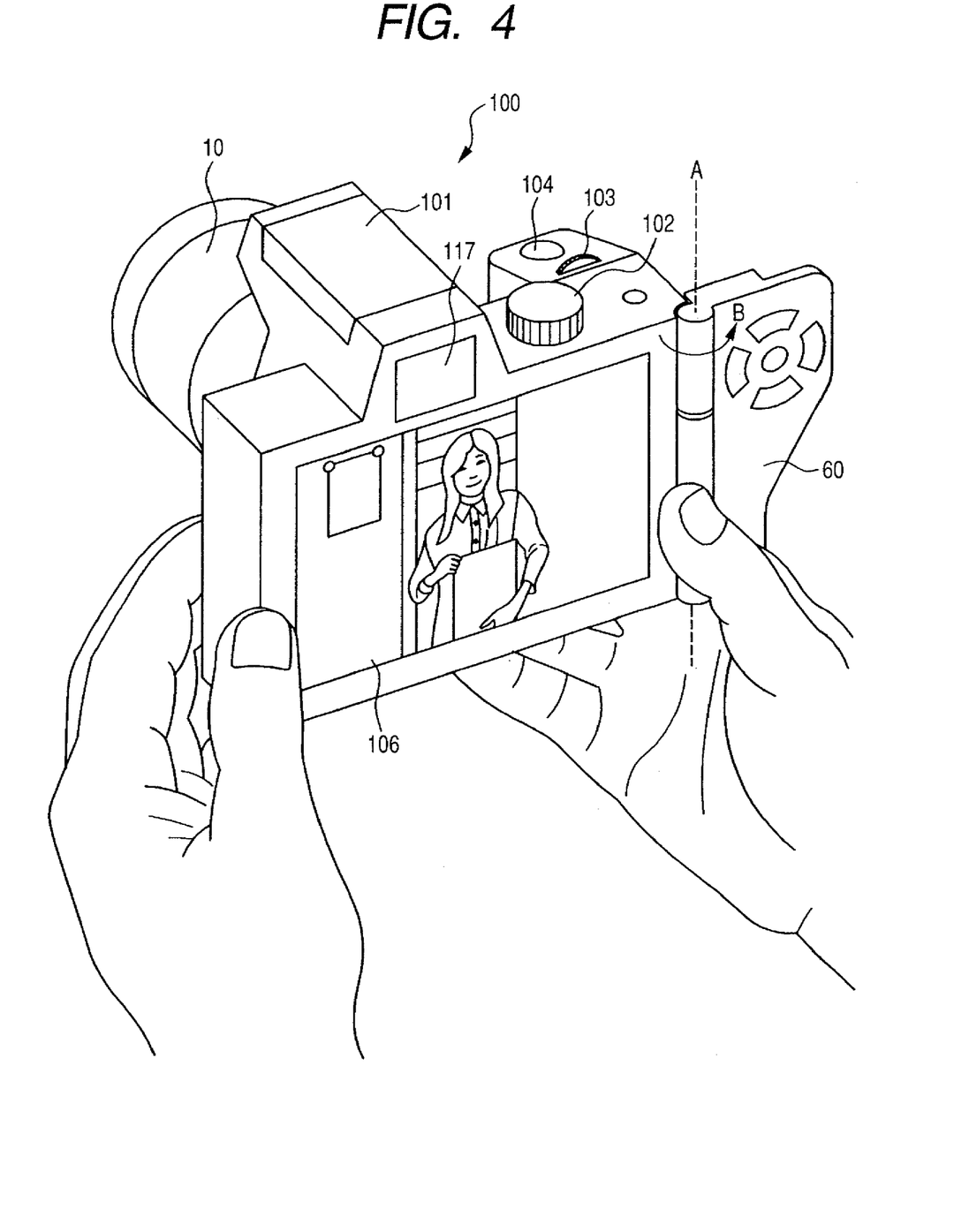
FIG. 4 illustrates a rear perspective view of the digital camera with the rear grip portion being in opening state.

FIG. 3 illustrates a rear perspective view of the digital camera 100 with the rear grip portion 60 being in closing state, and FIG. 4 illustrates a rear perspective view of the digital camera with the rear grip portion 60 being in opening state. When the rear grip portion 60 is in closing state and overlaps the image display unit 106 as shown in FIG. 3, the digital camera 100 detects the closing state of the rear grip portion 60 thereby entering into a photographing mode, and a viewfinder image is displayed on the image display unit 106 of FIG. 3. The viewfinder image is displayed in reduced size in a region excepting the portion where the rear grip portion 60 overlaps the image display unit 106, so that the photographer can view the entire image.

On the other hand, when the rear grip portion 60 is in opening state and does not overlap the image display unit 106 as shown in FIG. 4, the digital camera 100 detects the opening state of the rear grip portion 60 thereby entering into a reproduction mode, and a reproduced image is displayed on the image display unit 106 of FIG. 4. The reproduced image is displayed on the entire region of the image display unit 106 in a size greater than that of the viewfinder image in the photographing mode. Thus, when the rear grip portion 60 is in opening position, the entire display region of the image display unit 106 can be utilized for image display since the rear grip portion 60 is not in a state of covering the image display unit 106.

The rear grip portion 60 is a member configured to be pivotable by use of a hinge as shown in FIG. 4, this member being pivotably supported about the axis A and enforced in its opening direction (shown by arrow B) with elastically enforcing means (not shown) such as a spring. Moreover, there are provided a locking portion for locking the rear grip portion 60 to hold it in closing state, and a stopper portion for holding the rear grip portion 60 when it comes into opening state in which the rear grip portion 60 is approximately on the same level with the image display unit.

Figure 5:
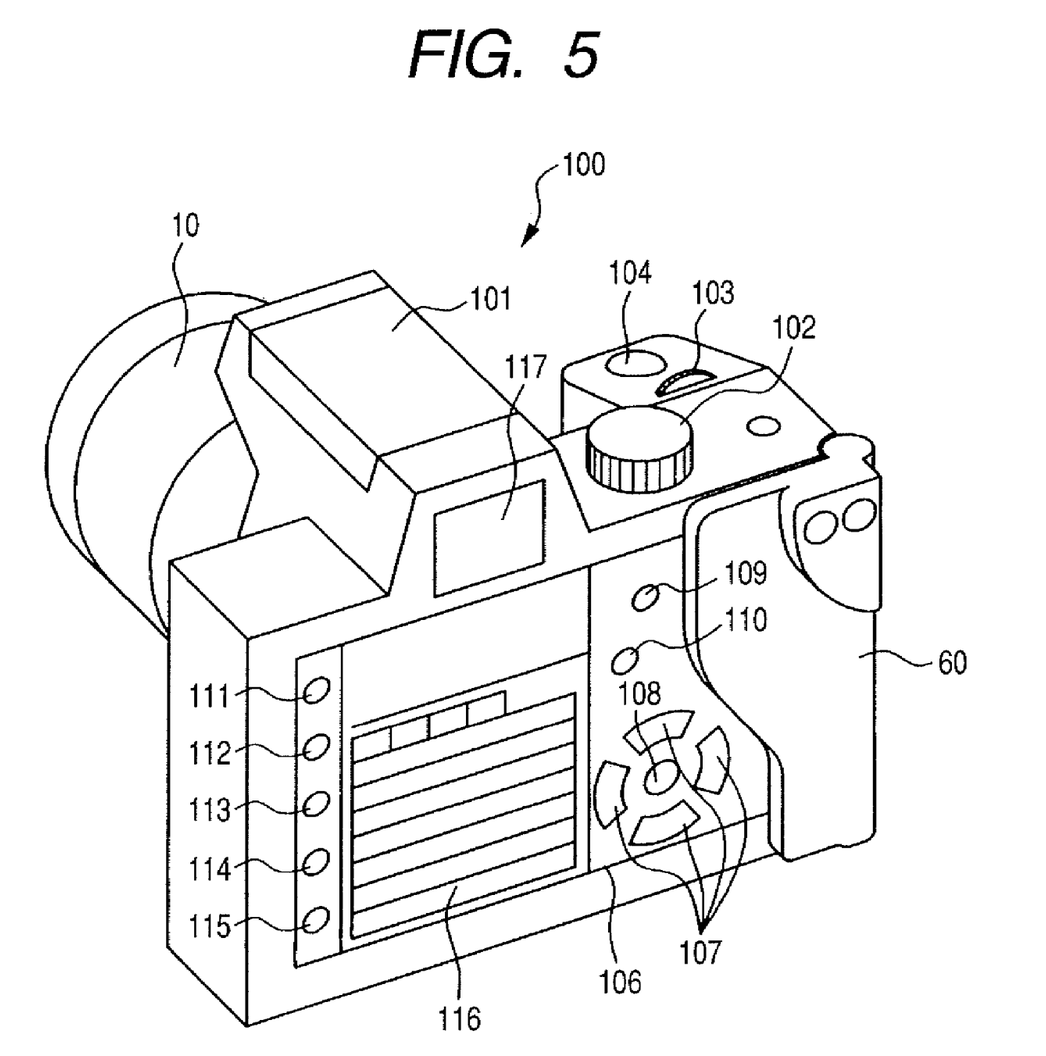
FIG. 5 illustrates a rear perspective view of the digital camera with its rear grip portion being in closing state and when displaying a menu screen.
Figure 6:
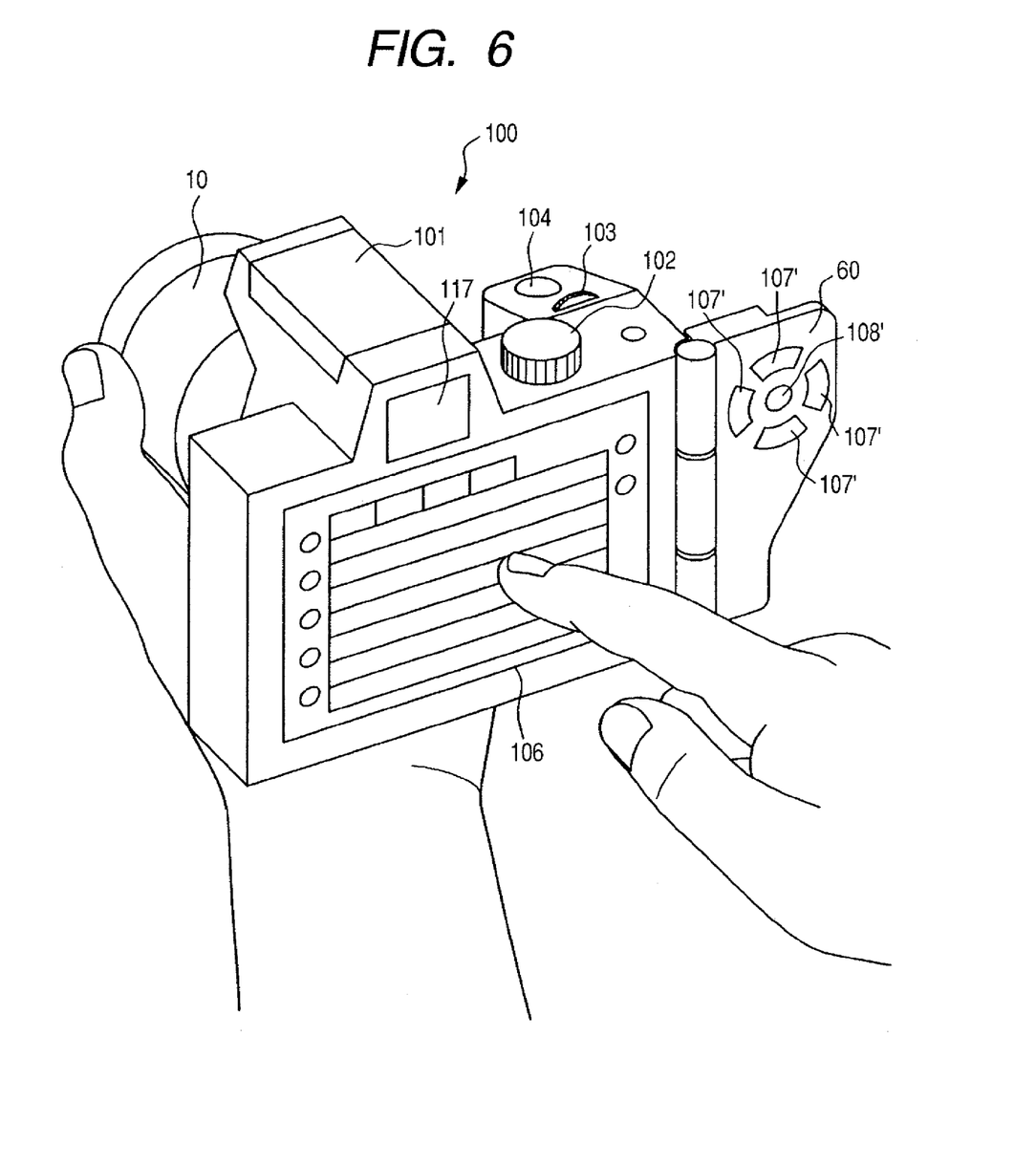
FIG. 6 illustrates a rear perspective view of the digital camera with its rear grip portion being in opening state and when displaying a menu screen.

FIG. 5 illustrates a rear perspective view of the digital camera 100 with the rear grip portion 60 being in closing state when displaying a menu screen, and FIG. 6 illustrates a rear perspective view of the digital camera 100 with the rear grip portion 60 being in opening state when displaying a menu screen.

As shown in FIG. 5, if the rear grip portion 60 is in closing state when displaying a menu screen on the image display unit 106, the menu screen is displayed in reduced size on a display region of the image display unit 106 which does not overlap with the rear grip portion 60. In the menu screen, software buttons including various operation buttons 109 to 115 such as a menu button, an info-button, a jump-button and an easy print button; a four-way operational key 107; and a decision button 108 are arranged and, in addition to that, a menu display region 116 for displaying menus is provided. By operating the four-way operational key 107, it is possible, for example, to select settings relating to photographing such as an AF mode, white balance and a photometry mode from the menu and decide them through a decision button 108.

On the other hand, as shown in FIG. 6, if the rear grip portion 60 is in opening state when displaying a menu screen on the image display unit 106, the menu screen is displayed in enlarged size, for example, on the entire region of the image display unit 106. Thus, by making the rear grip portion 60 to be in opening state when displaying the menu screen, it is possible to improve the visibility and operationality of the menu screen. Further, in the example of FIG. 6, in view of the visibility and operationality of the menu screen, the four-way operational key 107 and the decision button 108 are not displayed when the grip portion 60 is in closing state as shown in FIG. 5, thereby enlarging the menu display region. In an opening state of the rear grip portion 60, the operational means corresponding to the four-way operational key 107 and the decision button 108 are substituted by hard buttons of a four-way operational key 107' and a decision button 108' which are arranged in the back of the rear grip portion 60. Further, besides the four-way operational keys 107, 107' and the decision buttons 108, 108', the menu screens shown in FIGS. 5 and 6 can be operated by directly touching with finger since a touch-panel is employed for the image display unit 106 in this embodiment.

Figure 7:
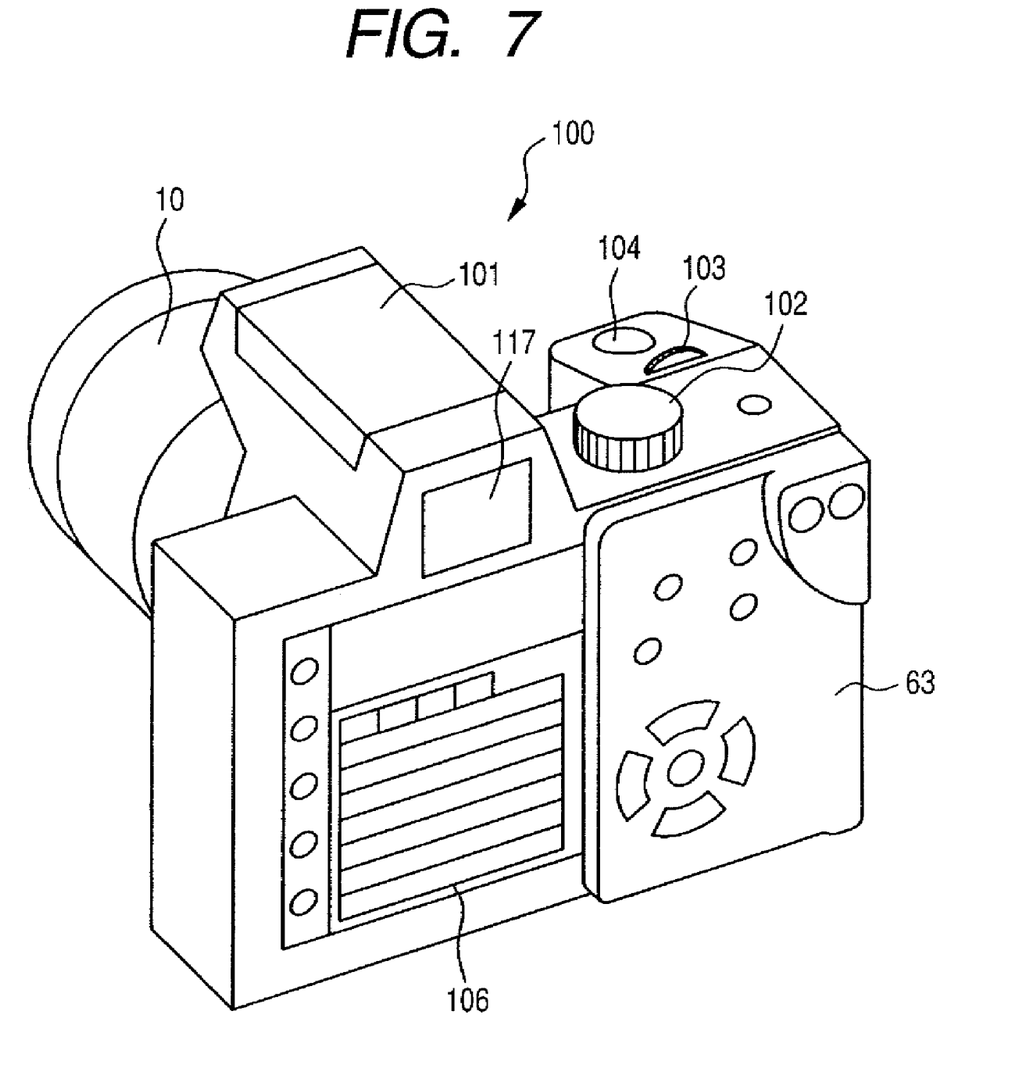
FIG. 7 illustrates a rear perspective view of the digital camera according to another embodiment of the present invention.
Figure 8:
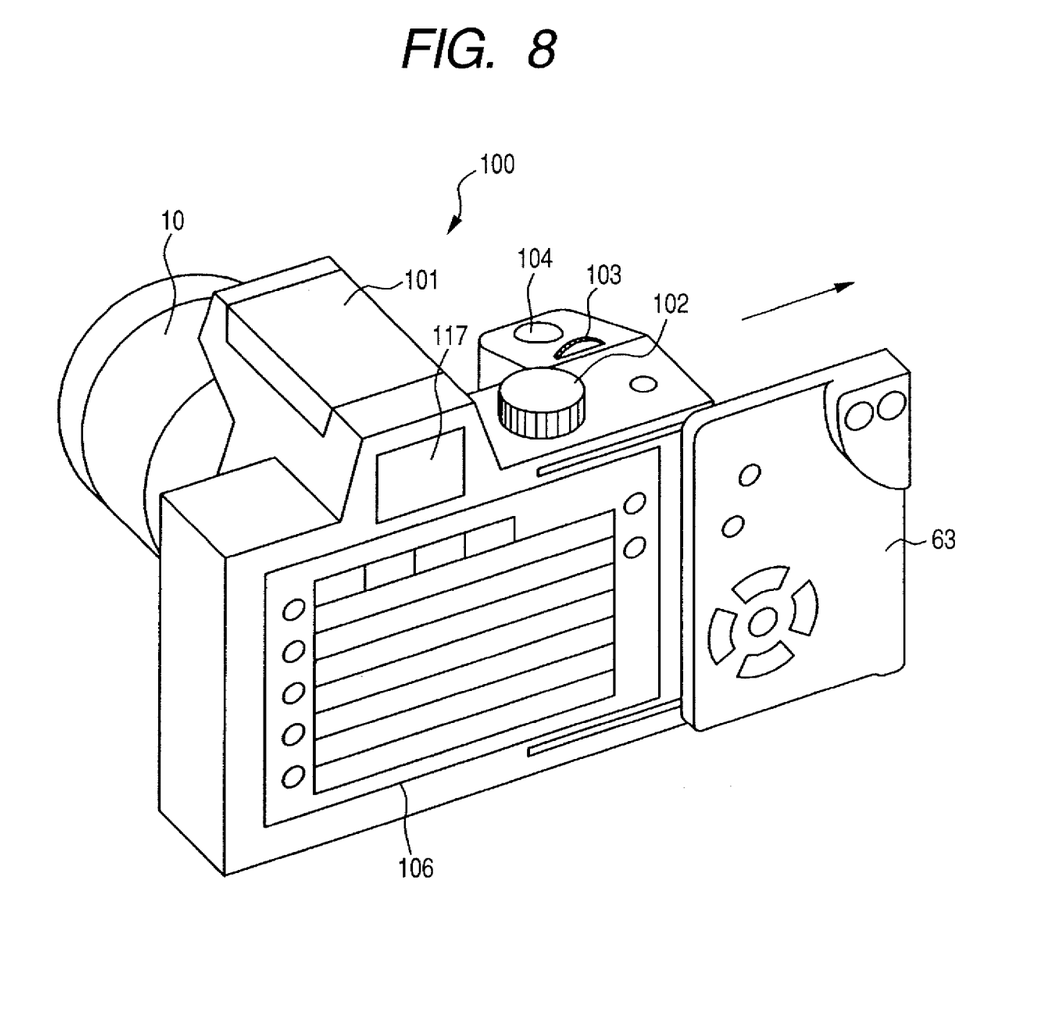
FIG. 8 illustrates a rear perspective view of the digital camera according to another embodiment of the present invention.

FIGS. 7 and 8 illustrate a rear perspective view of the digital camera 100 according to another embodiment of the present invention. The rear grip portion 63 of the digital camera 100 according to another embodiment of the present invention shown in FIGS. 7 and 8, moves in a sliding manner into a closing state overlapping the image display unit 106 or an opening state not overlapping the image display unit 106, and the digital camera 100 is provided with stopper means for holding the rear grip portion 63 in the closing state or opening state. In this embodiment, it is also possible to switch over display sizes of the display screen in the image display unit 106 depending on the opening state and closing state of the rear grip portion 64.

Figure 9:
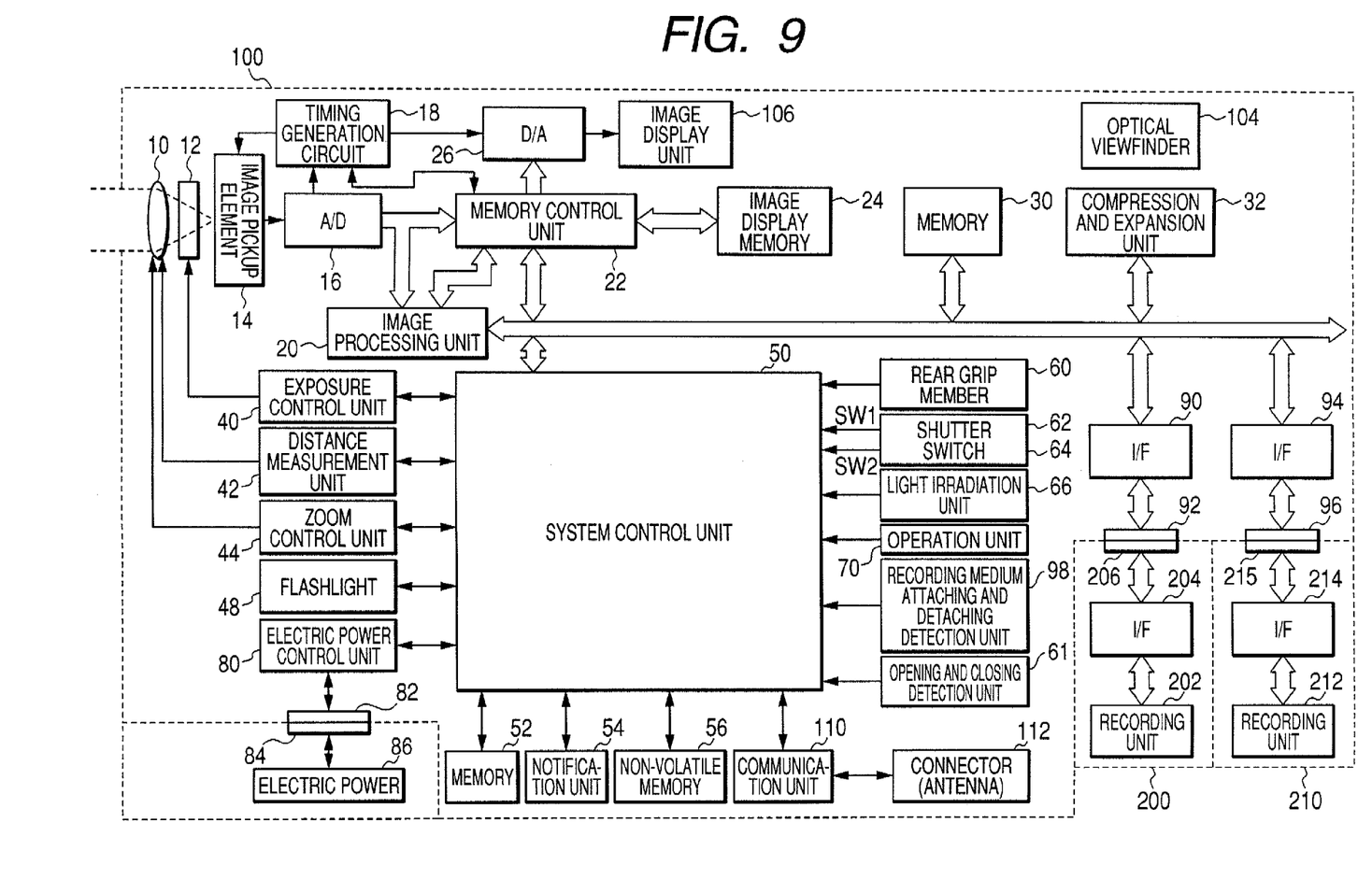
FIG. 9 illustrates a block diagram of the system configuration of a digital camera.

Next, the system configuration of a digital camera 100 will be described with reference to FIG. 9. FIG. 9 illustrates a block diagram of the system configuration of the digital camera 100.

In the digital camera 100, reference numeral 10 denotes a photographing lens, 12 a shutter with an iris function, 14 an image pickup element for converting an optical image into electrical signals, and 16 an A/D converter for converting an analog output of the image pickup element 14 to a digital signal.

Reference numeral 18 denotes a timing generation circuit which provides a clock signal and a control signal to the image pickup element 14, the A/D converter 16 and the D/A converter 26, respectively and is controlled by the memory control unit 22 and the system control unit 50.

Reference numeral 20 denotes an image processing unit which performs predetermined pixel interpolation processing and color conversion processing on the image data from the A/D converter 16 or the memory control unit 22. Moreover, the image processing unit 20 performs predetermined calculation processing using the image data outputted from the A/D converter 16 and, based on the calculation results obtained, the system control unit 50 performs TTL (through the lens)-based auto-focus (AF) processing, auto-exposure (AE) processing and flash light pre-emission (EF) processing for the exposure control unit 40 and the distance measurement unit 42. Further, the image processing unit 20 performs predetermined calculation processing using the image data outputted from the A/D converter 16 and also, based on the calculation results obtained, performs TTL-based auto white-balance (AWB) processing.

Reference numeral 22 denotes a memory control unit which controls the A/D converter 16, the timing generation circuit 18, the image processing unit 20, an image display memory 24, a D/A converter 26, a memory 30, and a compression and expansion unit 32. The image data outputted from the A/D converter 16 are written into the image display memory 24 or the memory 30 via the image processing unit 20 and the memory control unit 22, or via the memory control unit 22 alone.

Reference numeral 24 denotes an image display memory, 26 a D/A converter, and 106 an image display unit having a LCD (Liquid Crystal Display) etc. The image data to be displayed, which has been written into the image display memory 24, are displayed on the image display unit 106 via the D/A converter 26.

Sequentially displaying the picked-up image data using the image display unit 106 makes it possible to implement an electronic viewfinder function. Moreover, the image display unit 106 can turn ON or OFF the display according to the instruction from the system control unit 50. When the display on the image display unit 106 is turned off, it is possible to significantly reduce the power consumption of the digital camera 100. Further, the image display unit 106 displays the information relating to in-focus, blur, flash recharge, shutter speed, aperture value, exposure compensation, etc. according to instructions from the system control unit 50.

Reference numeral 30 denotes a memory for storing static or dynamic photographed images, the memory having enough storage capacity for storing a predetermined number of static images and a predetermined time period of dynamic images. This will make it possible to write images of a large amount into the memory 30 at a high speed even in the case of continuous photographing in which multiple static images are continuously photographed, or panoramic photographing. Moreover, the memory 30 can be used as a working area for the system control unit 50.

Reference numeral 32 denotes a compression and expansion unit which has a function of compressing the image data which are read from the memory 30, in accordance with a predetermined image compression method (such as adaptive discrete cosine transform (ADCT) etc.) and writing the compressed image data into the memory 30, and a function of expanding the image data which are read from the memory 30 and writing the expanded image data into the memory 30.

Reference numeral 40 denotes an exposure control unit for controlling the shutter 12 having an iris function, and the exposure control unit also has a flash light modulation function in conjunction with the flashlight 48. Reference numeral 42 denotes a distance measurement control unit for controlling the focusing of the photographing lens 10, and reference numeral 44 denotes a zoom control unit for controlling the zooming of the photographing lens 10. Reference numeral 48 denotes a flashlight having a light irradiation function of AF auxiliary light and a flash light modulation function. The exposure control unit 40 and the distance measurement control unit 42 are controlled by using a TTL method such that, as described above, the system control unit 50 controls the exposure control unit 40 and the distance measurement control unit 42 based on the calculation result obtained by processing the image data from the A/D converter 16 with the image processing unit 20.

Reference numeral 50 denotes a system control unit for controlling the entire digital camera 100, and reference numeral 52 denotes a memory for storing constants, variables and programs for the operation of the system control unit 50.

Reference numeral 54 denotes a notification unit such as a display device and a speaker for notifying the user of operational conditions and messages using characters, images, voices, etc. in response to the execution of the program in the system control unit 50; and the notification unit is disposed in one or more locations with good visibility in the vicinity of the operation unit of the digital camera 100. For example, the notification unit consists of a combination of LCDs, LEDs, voice generating elements, etc. Further, some of the functions of the notification unit 54 are installed in the optical viewfinder 104.

Among the display contents of the notification unit 54, those to be displayed on a LCD etc. include a single-shot/continuous photographing display, a self-timer display, a compression ratio display, a number of recorded pixels display, a number of recorded frames display, a number of remaining photographable frames display, a shutter speed display, an aperture value display, an exposure compensation display, a flashlight display, a red-eye modification display, a macro-photographing display, a buzzer setting display, a remaining clock-battery life display, a remaining battery life display, an error display, an information display by a multiple-digits numeral, a display of attachment/detachment state of recording media 202 and 212, a communication I/F operation display, a date/time display, etc.

Moreover, among the display contents of the notification unit 54, those to be displayed in the optical viewfinder 104 include an in-focus display, a blur-alarm display, a flash charge display, a shutter speed display, an aperture value display, and an exposure compensation display.

Reference numeral 56 denotes an electrically recordable/erasable non-volatile memory for which, for example, an EEPROM is used.

Reference numeral 60 denotes the rear grip portion 60 described above, opening and closing states of which are detected by the opening and closing detection unit 61 and notified to the system control unit 50.

Reference numerals 60, 62, 64 and 70 also denote operation means for inputting various operation instructions of the system control unit 50; these operation means consist of one of, or more in combination of a switch or dial, a touch-panel, a pointing device by viewpoint detection, voice recognition device, etc.

Hereinafter, these operation means will be specifically described.

Reference numeral 102 denotes a mode dial switch which can switch and set each of functional modes such as a power-off mode, auto-photographing mode, a photographing mode, a panoramic photographing mode, a reproduction mode, a multi-screen reproduction/erase mode and a PC connection mode.

Reference numeral 62 denotes a shutter switch SW1, which is turned ON in the course of the operation of the shutter button (not shown) and instructs the initiation of AF (auto-focus) processing, AE (auto-exposure) processing, AWB (auto-white balance) processing, flash light pre-emission (EF) processing and so on.

Reference numeral 64 denotes a shutter switch SW2, which is turned ON upon completion of the operation of the shutter button (not shown) and instructs the initiation of the operation of a series of processing including: an exposure processing in which the signals read out from the image pickup element 12 are written as the image data into the memory 30 via the A/D converter 16 and the memory control unit 22, and; a development processing which utilizes the calculation executed in the image processing unit 20 and the memory control unit 22; and a recording processing in which the image data are read out from the memory 30 to be subjected to image compression in the compression and expansion unit 32 and then are written into the recording medium 200 or 210.

Reference numeral 70 denotes an operation unit including various buttons, a touch-panel, etc., including a menu button, a set button, a macro/non-macro switching button, a multi-screen reproduction page-feed button, a flashlight setting button, a single photographing/continuous photographing/self-timer switching button, a menu shift + (plus) button, a menu shift − (minus) button, a reproduction image shift + (plus) button, a reproduction image shift − (minus) button, a photographing image quality selection button, an exposure compensation button, a time/date setting button, etc.

Reference numeral 66 denotes a light irradiation apparatus for irradiating light to an object, which is used when detecting a white pixel as described later.

Reference numeral 80 denotes an electric power control unit which includes a battery detection circuit, a DC/DC converter, a switching circuit for switching over the blocks to be energized, etc. and detects the attachment and detachment of battery, the kind of battery and the remaining life of battery to control the DC/DC converter based on the detection result and the instruction from the system control unit 50 thereby providing necessary voltage for a necessary period of time to each unit including the recording media.

Reference numerals 82 and 84 denote connectors, and reference numeral 86 denotes an electric power including a primary battery such as alkaline battery and lithium battery; a secondary battery such as a NiCd battery, a NiMH battery and a Li battery; and an AC adaptor.

Reference numerals 90 and 94 denote an interface to a recording medium such as a memory card and a hard disk; reference numerals 92 and 96 denote connectors for providing connection with the memory card, the hard disk, etc.; and reference numeral 98 denotes a recording medium attaching and detaching detection unit for detecting whether or not recording medium 200 or 210 is attached to the connector 92 or 96.

This embodiment is described herein as having 2 systems of interfaces and connectors for attaching the recording media. Of course, the interface and connector for attaching the recording medium may be configured to have a single system or multiple systems, or any number of systems. Moreover, they may be configured to have in combination interfaces and connectors of different standards.

The interface and connector can be configured using those conforming to standards such as the PCMCIA card and the CF (Compact Flash (registered trademark)) card. When the interfaces 90 and 94 and the connectors 92 and 96 are configured using those conforming to the standards such as the PCMCIA card and the CF card, it is possible by connecting various communication cards such as a LAN card, a modem card, a USB card, IEEE1394 card, a P1284 card, a SCSI card and a communication card such as a PHS to transfer and receive image data and management information relating to the image data to and from other computers and peripheral apparatuses such as printers.

Reference numeral 104 denotes an optical viewfinder which allows photographing using an optical viewfinder alone without using the electronic viewfinder function by the image display unit 106. Also, within the optical viewfinder 104, some of the functions of the notification unit 54, for example, the in-focus display, blur-alarm display, flash recharge display, shutter speed display, aperture value display, exposure compensation display, etc. are installed.

Reference numeral 110 denotes a communication unit, which has various communication functions such as RS232C, USB, IEEE1394, P1284, SCSI, modem, LAN and wireless communications.

Reference numeral 112 denotes a connector, or an antenna in the case of wireless communication, for connecting the digital camera 100 with other apparatuses via the communication unit 110.

Reference numerals 202 and 212 denote recording media such as a memory card and a hard disk. The recording media 200 and 210 comprise: recording units 202 and 212 respectively including a semiconductor memory, a magnetic disc, etc.; interfaces 204 and 214 to the digital camera 100; and connectors 206 and 216 for providing connection with the digital camera 100.

Figure 10:
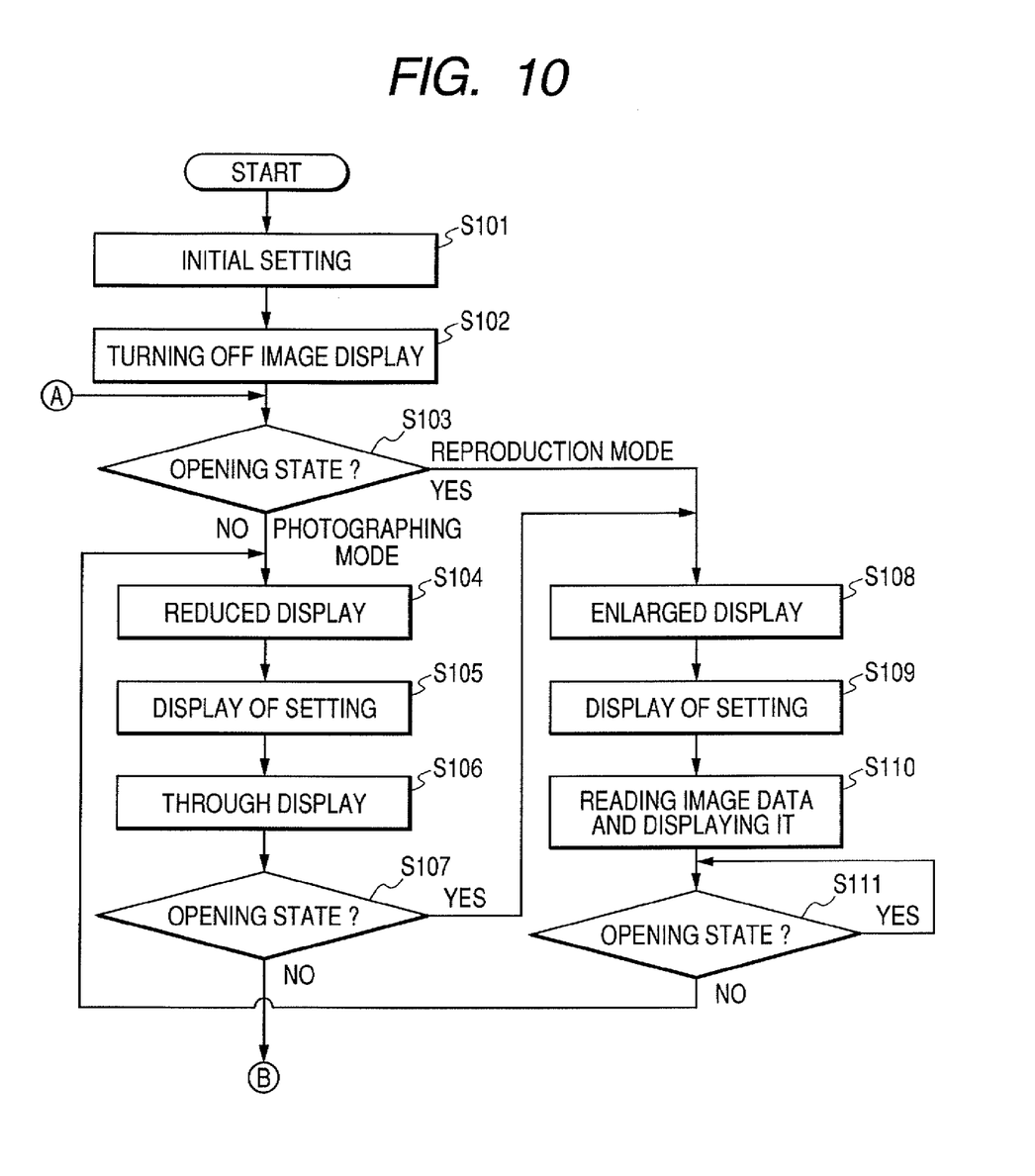
FIG. 10 illustrates a flow chart to show the control operation of display image on the image display unit.
Figure 11:
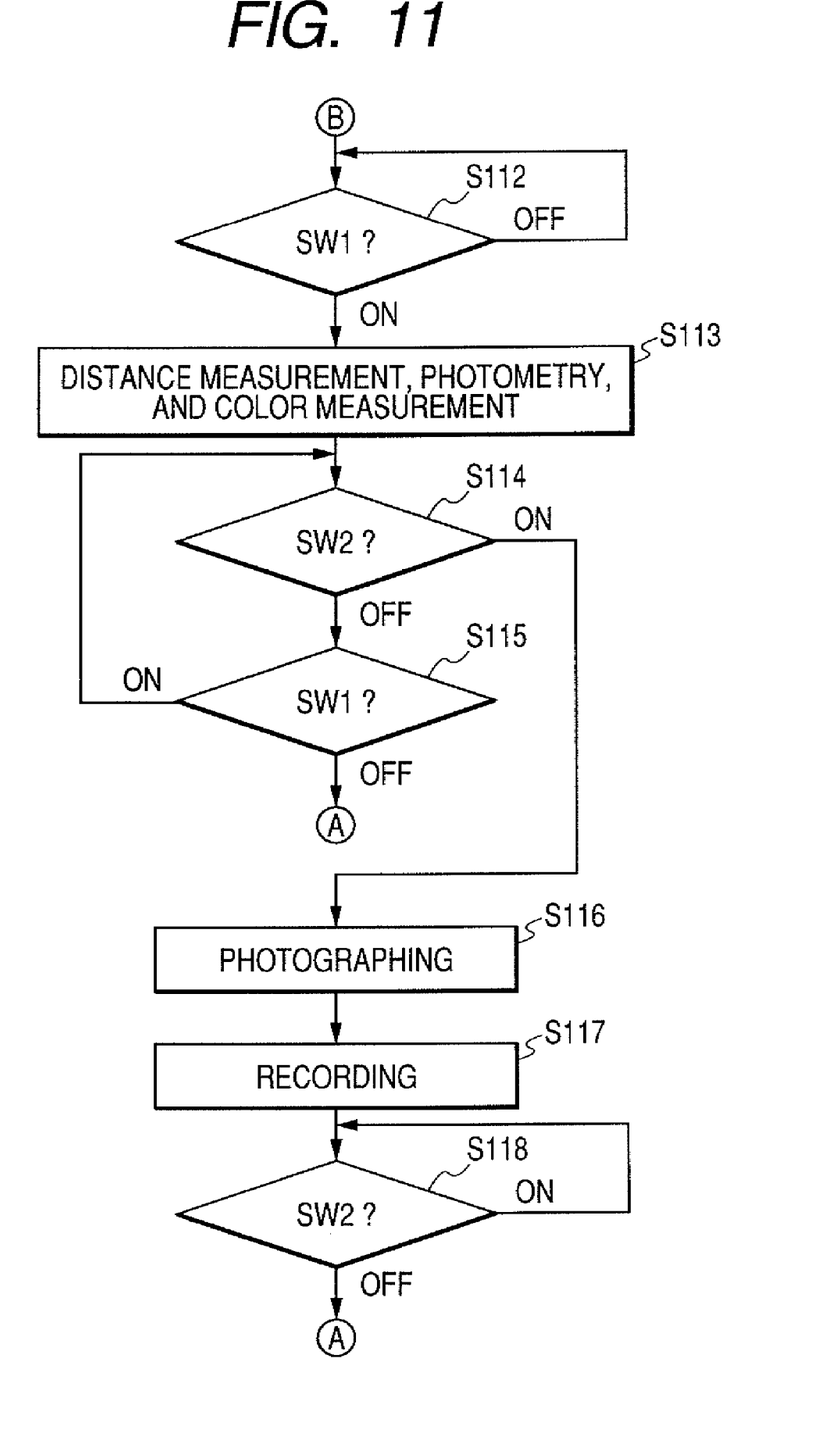
FIG. 11 illustrates a flow chart to show the control operation of display image in the image display unit.

Next, the control operation of display image in the image display unit 106 will be described. FIGS. 10 and 11 illustrate flow charts to show the control operation of display image in the image display unit 106.

In FIG. 10, upon power-up such as by battery replacement, the system control unit 50 initializes flags and control variables (step S101). Next, the image display of the image display unit 106 is initialized to be OFF state (step S102).

Next, the system control unit 50 determines whether the rear grip portion 60 is in opening state or not (step S103), in accordance with the notification from the opening and closing detection unit 61. If the rear grip portion 60 is in closing state (step S103/NO), a photographing mode is entered and the system control unit 50 sets the image display size in the image display unit 106 to be a reduced display (step S104).

Then, the system control unit 50 notifies the user of various setting conditions of the digital camera 100 through images and voices using the notification unit 54 (step S105). Next, the system control unit 50 successively displays the picked-up image data in a reduced display size (step S106).

On the other hand, in the decision of step S103, if the rear grip portion 60 is determined to be in closing state (step S103/YES), the process proceeds to step S108.

Then, the system control unit 50 determines whether the rear grip portion 60 is in opening state or not, in accordance with the notification from the opening and closing detection unit 51 (step S107). If the rear grip portion 60 is in opening state (step S107/YES), the process proceeds to step S108, and if the rear grip portion 60 is in closing state (step S107/NO), the process proceeds to step S112 in FIG. 11.

From step S108, a reproduction mode is entered, and the system control unit 50 sets the image display size in the image display unit 106 to be enlarged display (step S108).

Then, the system control unit 50 notifies the user of the various setting conditions of the digital camera 100 through images and voices using the notification unit 54 (step S109). Next, the system control unit 50 reads the image data from the recording media 202 and 212 and displays the image data in enlarged size onto the image display unit 60 (step S110).

Then, the system control unit 50 determines whether or not the rear grip portion 60 is in opening state (step S111). If the rear grip portion 60 is in opening state, the reproduction mode is continued without changes. If the rear grip portion 60 is in closing state, the process proceeds to step S104.

In step S112, the system control unit 50 checks the condition of the shutter switch SW1, and if the shutter switch SW1 is OFF (step S112/OFF), waits until the shutter switch SW1 is turned ON.

When the shutter switch SW1 is turned ON (step S112/ON), the system control unit 50 performs distance measurement processing to focus the lens 10 on the object, and also performs photometry processing to determine the aperture value and the shutter time. As result of the photometry, if necessary, a flash flag is set and setting of flashlight is performed.

When distance measurement, photometry, and color measurement processing (step S113) is completed, the process proceeds to step S114.

In next step S114, if the shutter switch SW2 is not depressed (step S114/OFF) and the shutter switch SW1 is released (step S115/OFF), the process goes back to step S103. If the shutter switch SW2 is not depressed (step S114/OFF) and the shutter switch SW1 remains to be ON (step S122/ON), the process goes back to step S114. Moreover, if the shutter switch SW2 is depressed (step S114/ON), the process proceeds to step S116.

In step S116, the system control unit 50 performs photographing processing which includes: light exposure processing for writing the photographed image data into the memory 30 through the image pickup element 14, the A/D converter 16, the image processing unit 20 and the memory control unit 22, or directly through the memory control unit 22 from the A/D converter 16; and development processing for reading and performing various processing on the image data written into the memory 30 using the memory control unit 22 and the image processing unit 20 as needed.

After the photographing processing in step S116 is completed, the process proceeds to step S117 and performs recording processing, in which the system control unit 50 reads the photographed image data written into the memory 30 and performs various image processing using the memory control unit 22 and the image processing unit 20 as needed, and also performs image compression processing according to the mode set through the compression and expansion unit 32, thereafter writing the image data into the recording medium 200 or 210 (step S117).

When the recording processing in step S117 is completed, the system control unit 50 checks the condition of the shutter switch SW2, and if it is OFF (step S118/OFF), the process goes back to step S103, and if it remains to be ON (step S118/ON), waits until it becomes OFF.

Furthermore, although the above described embodiment has been described so far assuming that transition to the photographing mode occurs when the rear grip portion 60 is in closing state, and transition to the reproduction mode occurs when the rear grip portion 60 is in opening state, the invention is not limited by this embodiment, and the process may be either in photographing mode when the rear grip portion 60 is in opening state, or in reproduction mode when in closing state.

Further, the detection of the opening and closing states of the rear grip portion 60 may be performed such that the rear grip portion 60 is determined to be in closing state when it is in a complete closing state, and otherwise to be in opening state, or conversely such that the rear grip portion 60 is determined to be in opening state when it is in a complete opening state, and otherwise to be in closing state. Furthermore, the rear grip portion 60 may be determined to be in closing state when the degree of opening thereof with respect to the face of the image display unit 106 is less than the predetermined angle, and to be in opening state when larger than the predetermined angle. Moreover, when the rear grip portion 60 is a sliding form, a constant slide distance may be specified so that the rear grip portion 60 is determined to be closing state when the position thereof is less than the slide distance, and to be close state when larger than the slide distance.

As so far described, in the embodiments of the present invention, the rear grip portion 60 may be moved as desired; for example, when the rear grip portion 60 needs to be grasped, for example, during photographing, the rear grip portion 60 is positioned to be in closing state thus placing greater importance to the ease of grasping the digital camera 100, and when the rear grip portion 60 needs not to be grasped, for example, during reproduction, the rear grip portion 60 is positioned to be in opening state thus allowing the improvement of the visibility and operationality for the display image of the image display unit 106. Therefore, according to the embodiments of the present invention, it is possible to improve the visibility and operationality of the image display unit 106 while maintaining the ease of holding the digital camera 100.

Further, the embodiments of the present invention is configured such that the image display size in the image display unit 106 is switched over depending on the opening and closing states of the rear grip portion 60. Therefore, when the rear grip portion 60 is in opening state, the image is displayed as expanded over the entire image display unit 106 and when in closing state, the image is displayed in reduced size thereby allowing the entire display image to be referenced all the time. Therefore, the visibility of the display image and operationality of the image display unit 106 can be improved.

Moreover, an object of the present invention can also be achieved by providing storage medium recording the program code of the software for implementing the functions of the embodiments described above to a system or an apparatus, and causing the computer of the system to read and perform the program code from the storage medium.

In this case, the program code itself which is read from the storage medium will implement the functions of the embodiments described above, and therefore the program code itself and the storage medium for storing the program code will constitute the present invention.

As the storage medium for providing program code, it is possible to use, for example, a flexible disk, a hard disk, an optical disk, a magneto-optical disk, a CD-ROM, a CD-R, magnetic tape, a non-volatile memory card, a ROM, etc.

Moreover, also included in the present is a case that based on the instruction of the program code which has been read by a computer, an OS or the like operating on the computer performs some or all of the actual processing, by which the functions of the embodiments described above are realized.

Moreover, also included is a case that after program code which has been read out from the storage medium is written into a memory provided in a functional extension unit etc. connected to the computer, a CPU or the like performs actual processing based on the instruction of the program code thereby realizing the embodiments described above.

The present embodiment comprises a grip member movable between a closing state with overlapping the image display unit and an opening state with not overlapping the image display unit. Therefore, according to the present invention, the grip member can be moved as desired so that, for example, when the grip member needs to be grasped such as during photographing, the grip member can be located in the closing state thus placing greater importance on the ease of holding the image pickup apparatus, and when the grip member does not need to be grasped such as during reproduction, the grip member can be located in the opening state thus improving the visibility for the display image and operationality of the image display unit. Thus, it is possible to improve the visibility and operationality of the image display unit while maintaining the ease of holding the image pickup apparatus.

Moreover, in other embodiments, configuration is such that the display image size in the image display unit is switched over depending on the opening and closing states of the grip member. Therefore, for example, when the grip member is in opening state, the image is displayed in enlarged size over the entire image display unit, and when in closing state, the image is displayed in reduced size, thus allowing the entire display image to be referenced all the time thereby improving the visibility for display image and the operationality of the image display unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-264040, filed Sep. 12, 2005, which is hereby incorporated by reference herein in its entirety.

What is claimed is:

1. An image pickup apparatus comprising:
an image pickup unit, adapted to pick up an object image;
an image display unit, adapted to display an image;
a grip portion to be grasped till operator, a part of grip portion move between a first position in which said part of grip portion overlaps a portion of said image display unit and a second position in which said part of grip portion does not overlap said image display unit; and a control unit, adapted to control said image display unit an accordance with said part of grip portion moving between said first position and said second position such that when said part of grip portion is at said first position, said display unit displays an image in a size corresponding to a region excepting the portion where said part of grip portion overlaps said image display unit, and when said part of grip portion is at said second position, said display unit displays the image in a size corresponding to a region including the portion where said part of grip portion overlaps said image display unit.

2. The image pickup apparatus according to claim 1, wherein said part of grip portion is a member which is pivotable by use of a hinge.

3. The image pickup apparatus according to claim 1, wherein said part of grip portion is a member which is movable in a sliding manner.

4. The image pickup apparatus according to claim 1, wherein said part of grip portion is formed with a projection portion at a location corresponding to the thumb of the operator.

5. The image pickup apparatus according to claim 1, wherein said control unit effects the control to set a photographing mode in which an object image can be picked up in said image pickup unit, when said part of grip portion is at said first position, and to set a reproduction mode in which picked up images can be reproduced on said image display unit, when said part of grip portion is at said second position.

6. The image pickup apparatus according to claim 1, wherein said part of grip portion comprises an operation member to he operated by die operator.

7. The image pickup apparatus according to claim 1, wherein said part of grip portion comprises an operation member to be operated by the operator, arranged in a region thereof which is supposed to be the rear face thereof when it is at said first position, and wherein said control unit controls said image display unit to display thereon an operation screen to be operated by the operator is displayed thereon when said part of grip portion is at said second position.

8. The image pickup apparatus according to claim 1, wherein said pail of grip portion comprises an operation member to be operated by the operator, arranged in a region thereof which is supposed to be the rear face thereof when it is at said second position, and wherein said control unit controls said image display unit to display thereon an operation screen to be operated by the operator is displayed thereon when said part of grip portion is at said first position.

9. A method of controlling an image pickup apparatus having an image pickup unit adapted to pick up an object image, an image display unit adapted to display an image and a grip portion to be grasped by an operator, a part of grip portion move between a first position in which said part of grip portion overlaps a portion of said image display unit and a second position in which said part of grip portion does not overlap said image display unit, said method comprising:

a control step of controlling said image display unit in accordance with said part of grip portion moving between said first position and said second position such that when said part of grip portion is at said first position, said display unit displays an image in a size corresponding to a region excepting the portion where said part of grip portion overlaps said image display unit, and when said part of grip portion is at said second position, said display unit displays the image in a size corresponding to a region including the portion where said part of grip portion overlaps said image display unit.

* * * * *